United States Patent [19]

Ephraim et al.

[11] Patent Number: 4,786,001

[45] Date of Patent: Nov. 22, 1988

[54] COFFEE GRINDER-MIXER ASSEMBLY FOR PRODUCING BOTH REGULAR AND HIGH YIELD GROUND COFFEE

[75] Inventors: Max Ephraim, Evergreen Park; Daniel R. Ephraim, Glencoe; Philip C. Ephraim, Chicago, all of Ill.

[73] Assignee: Modern Process Equipment, Inc., Chicago, Ill.

[21] Appl. No.: 869,040

[22] Filed: May 30, 1986

[51] Int. Cl.$^4$ .............................................. A47J 42/00
[52] U.S. Cl. ................................. 241/101 B; 366/293; 366/296
[58] Field of Search .............. 241/101 B, 30; 366/293, 366/294, 295, 296; 426/518–519

[56] References Cited

U.S. PATENT DOCUMENTS 4,428,535 1/1984 Venetucci ........................ 366/296

Primary Examiner—Joseph Golian
Attorney, Agent, or Firm—Dressler, Goldsmith, Shore, Sutker & Milnamow, Ltd.

[57] ABSTRACT

A coffee grinder-mixer assembly and method for alternatively producing high yield coffee and regular yield coffee comprising a grinding head, an elongated mixer box, a first elongated shaft mounting auger means and supported for rotation in the mixer box, second elongated shaft concentric with the first shaft for rotation relative to the first shaft, a plurality of paddles mounted on the second shaft, and means for alternatively co-rotating and counter-rotating the first shaft and the second shaft, relative to the other, thereby alternatively to produce high yield and regular yield coffees.

7 Claims, 2 Drawing Sheets

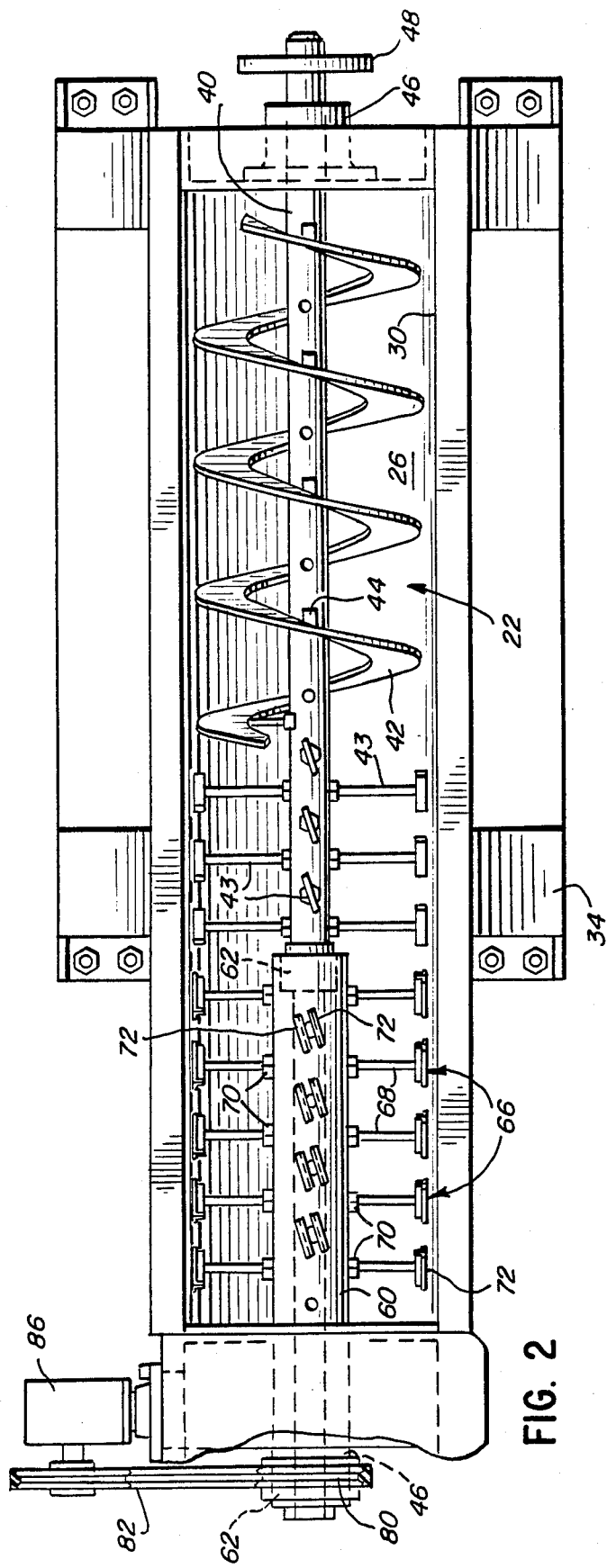
FIG. 2
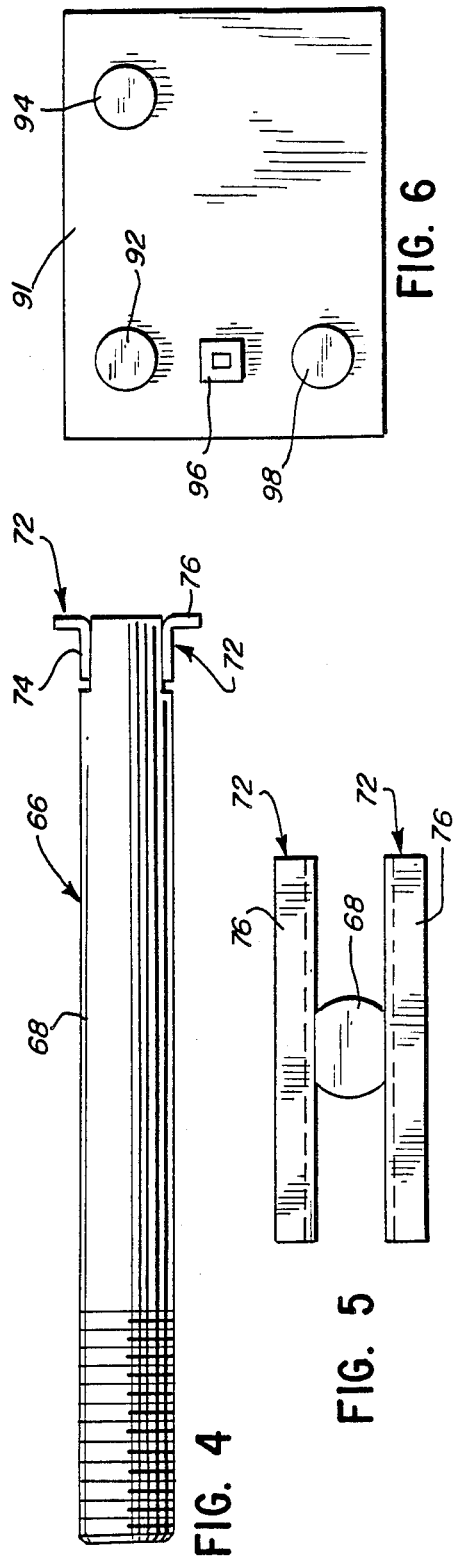
FIG. 4
FIG. 5
FIG. 6

COFFEE GRINDER-MIXER ASSEMBLY FOR PRODUCING BOTH REGULAR AND HIGH YIELD GROUND COFFEE

BACKGROUND OF THE INVENTION

Industrial coffee grinders have been well-known for a number of years. They frequently comprise one or more coffee-grinder sections, which may be stacked, above a conveyor. The mixer, which may comprise a screw conveyor, blends and conveys the ground coffee through a screw conveyor section to a mixer-discharge section. The mixer-discharge section may contain paddles as well as partition plates.

Industrial coffee grinder-mixer assemblies are frequently intended to be used to grind and blend two grades of coffee for packaging. The two grades are known as high yield (generally about 13 ounces to the can) and regular yield sixteen ounces to the can, each of which provides a generally equal number of cups of coffee for the user.

To produce high yield coffee, it is necessary to blend and convey the ground coffee through the mixer without re-compacting it.

Because typical grinder-mixer assemblies are configured such that they typically re-compact ground coffee to produce regular yield coffee, the mixers must be "modified" each time they are to be switched over to the production of high yield coffee, such as by removing partition walls, by opening alternative outlets, and the like. With currently available machines this requires down-time and the intervention of mechanics, and is troublesome. Accordingly, many users of such machines require separate machines and set-ups for the production of each of high yield and regular yield ground coffees.

It would be of substantial advantage to provide a "universal" grinder-mixer machine and method for alternatively producing high yield and regular yield ground coffees which would not require alteration of the machine or the intervention of mechanics to switch over the machine from the production of one such ground coffee to the other.

SUMMARY OF THE INVENTION

In accordance with the present invention, an improved, coffee grinder-mixer assembly for producing both high yield ground coffee and regular yield ground coffee is provided. The grinder-mixer assembly comprises a grinding head, an elongated mixer box for receiving ground coffee from the grinding head adjacent one end and for discharging ground coffee therefrom adjacent the other end, and an elongated first shaft means such as a mixer shaft mounting auger means and supported for rotation in the mixer box. The auger means is disposed to drive ground coffee along the elongated mixer box from one end towards the other end.

An elongated second shaft means such as a mixer sleeve is concentric with the first shaft means. Preferably the sleeve is mounted on bearings on the mixer shaft for rotation relative to the shaft. The mixer sleeve is disposed adjacent the other end of the box and downstream of the auger means. A plurality of paddles are mounted on the mixer sleeve, and means are provided for driving the shaft and the sleeve, one relative to the other. Thus the shaft and sleeve may co-rotate, may counter-rotate or may co-rotate at different rates of speed. Means for reversing the direction of rotation of the sleeve may be provided.

Preferably each paddle comprises an arm and a pair of paddle members mounted on each arm. In a preferred form the paddles each comprise an L-shaped member having a long leg and a short leg, with the long legs being fixed with the arm in parallel array, and with the short legs each extending outwardly from the arm.

Desirably the auger means comprises a spiral and, and separate driving means for each of the shaft and sleeve are provided.

The method of the present invention comprises the steps of providing a grinding head, mixer box, a first shaft means such as a mixer shaft and auger means, and a second concentric shaft means such as a mixer sleeve mounted on, and for rotation relative to, the mixer shaft, with a plurality of paddles mounted on the mixer sleeve, and then introducing ground coffee from the grinding head into the mixer box at one end of the box, conveying the ground coffee from that end towards the other end by rotating the shaft and auger means, and then, alternately, co-rotating the sleeve with the shaft to minimize re-compacting of the ground coffee to produce a high yield ground coffee, and counter-rotating the sleeve relative to the shaft to develop a back pressure to compact the ground coffee to produce a regular yield ground coffee.

Further objects, features and advantages of the present invention will become apparent from the following description and drawings.

BRIEF DESCRIPTION OF THE DRAWINGS

FIG. 2 is a plan view of the mixer assembly, with portions of the grinder-mixer assembly removed;

FIG. 4 is an enlarged view of a paddle member 4 FIG. 2; and

FIG. 5 is an end elevational view of the paddle member of FIG. 4; and

FIG. 6 is a schematic showing of the control panel for the assembly of FIG. 1.

DESCRIPTION OF THE PRESENTLY PREFERRED EMBODIMENT

Figure 1:
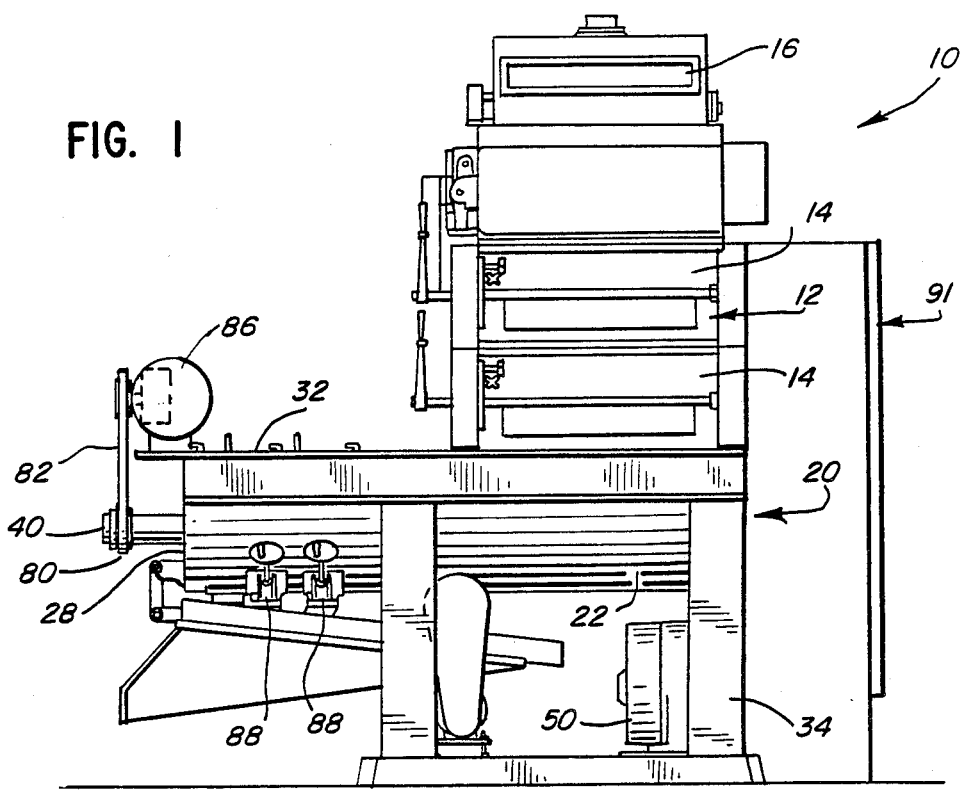
FIG. 1 is a front elevational view of a coffee grinder-mixer assembly of the present invention.
Figure 3:
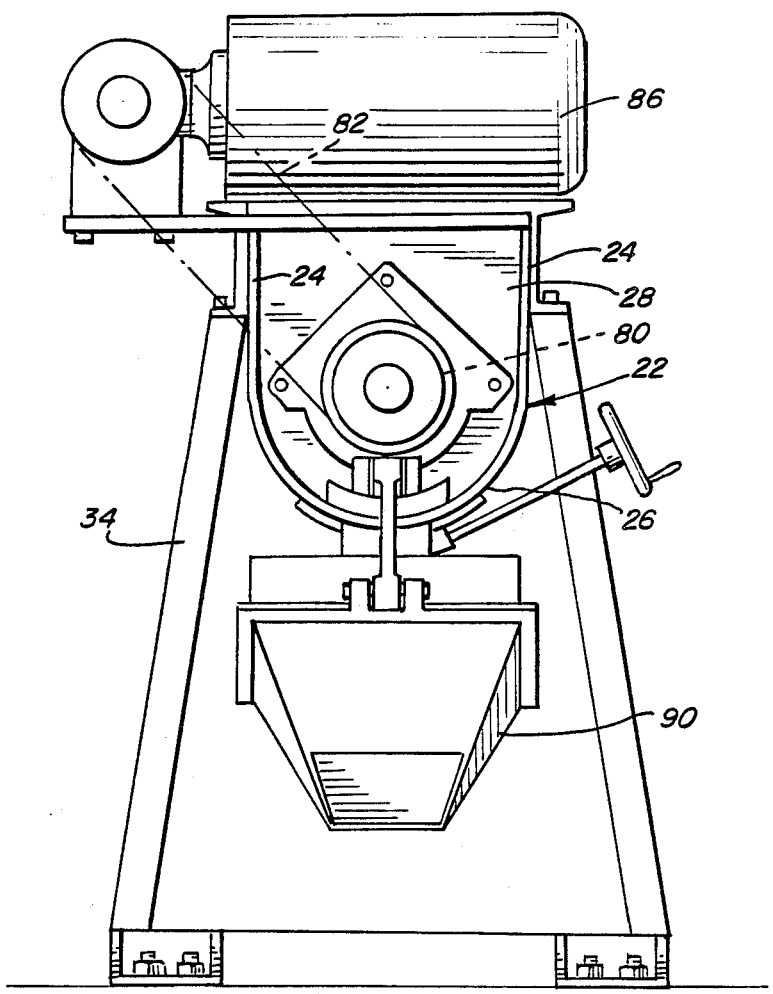
FIG. 3 is an end elevational view of the assembly of FIG. 1.

Referring now to the drawings, a presently preferred embodiment of a coffee grinder-mixer assembly 10 which is universally adaptable for production of equivalent high yield and regular yield coffees is shown. Assembly 10 comprises a grinding head 12 comprising a stack of one or more grinders 14 with a filling or supply inlet 16 for the coffee beans to be ground. The grinding head 12 may be conventional and may be constructed in accordance with well-known practices in the art.

Grinder-mixer assembly 10 also comprises a mixing section 20. Section 20 includes an elongated mixer box 22 which is generally U-shaped in transverse cross-section. The upper portions of the sides 24 are generally vertically oriented and parallel. The lower portion of the sides 24 merge with the bottom 26 in a generally semi-circular configuration in transverse cross-section. The box is provided with vertical ends 28.

Adjacent grinding head, the box 20 defines an open top 30 so that the coffee discharged from the grinding head 12 may drop into and be received by the box adjacent one end of the box. The top of the box remote from the grinding head may be covered with a removable access plate 32. To provide for proper structural support, the box is secured to a frame 34 adjacent the upper portions of the sides 24. It is upon the frame 34 which the grinding head 12 is supported.

After the coffee is ground and drops into the box 22, it is conveyed from one end to the other, i.e., from the right to the left as illustrated in FIG. 1. To that end a first shaft means such as an elongated driveable mixer shaft 40 is provided. Mixer shaft 40 amounts an auger means. The auger means comprises a spiral 42 and, where desired, a plurality of paddles 43. Spiral 42 stands off from, and is spaced from, the shaft 40. Spiral 42 is disposed to drive ground coffee along the elongated mixer box from one end towards the other end, and where they are used, the shaft paddles 43 cooperate in that. Spiral 42 is secured to the shaft as by bolting the spiral to a series of spaced arms 44 which in turn may be bolted to the shaft 40. The spiral 42 and paddles 43 extend approximately 50% or more of the internal length of the box 22.

As seen in FIG. 2, shaft 40 is supported for rotation along its axis of the ends of the box 22. Thus, at each of the ends 28 of the box 22 a bearing assembly 46 is provided. At one end, such as the right hand end in the embodiment illustrated, the shaft 40 is provided with a drive sprocket 48 which is adapted to be driven by an adjustable speed gear drive and motor assembly 50.

At the other end of the box 22, i.e., downstream of the spiral 42 and adjacent the left hand portion of the mixer shaft, a second shaft means such as a mixer sleeve 60 is provided. Sleeve 60 is mounted concentric with the mixer shaft and is mounted to be rotatable relative to the mixer shaft 40. In the illustrated embodiment the mixer sleeve is provided with bearings 62, one adjacent each end of the sleeve 60. Bearings 62 are fixed to the sleeve 60 and permit rotation of the sleeve 60 on and relative to mixer shaft 40.

Sleeve 60 mounts a plurality of mixer paddles 66 which comprise paddle arms 68 secured to the sleeve 60. Preferable each paddle arm 68 is threaded at an end and is threadingly mated with the sleeve. Nuts 70 are used to fix the arms 68 to the sleeve in the desired position of the paddle members 72. Each paddle arm mounts, as by welding, a pair of paddle members which, as shown in FIG. 4, are generally L-shaped. The vertical legs 74 of the L are spaced and parallel, and the horizontal legs 76 of the L extend outwardly in opposite directions. Because the paddles 66 are threadedly secured to the sleeve, the angles of the paddle members 72 may be adjusted as desired relative to the sleeve.

It will be apparent that paddles 43 may be configured and proportioned just like paddles 66 and that they be threadedly mounted to shaft 40 in the same manner paddles 66 are mounted to mixer sleeve 60. However, paddles 43 have only one paddle arm positioned to tend to drive the ground coffee in the same direction as the spiral 42.

The sleeve 60 is adapted to be driven separately from the mixer shaft 40, and is mounted to be co-rotated or counter-rotated relative thereto. If the sleeve co-rotates with the mixer shaft, it may be rotated at the same or a different speed, depending upon the user's needs.

As stated, the sleeve 60 is rotatably mounted on mixer shaft 40 by a pair of mixer sleeve bearings 62. The sleeve 60 is provided with a sprocket 80 which is keyed thereto, and over which a drive chain 82 is trained.

Drive chain 82 is likewise trained over an output sprocket of an adjustable speed, reversible motor driven gear box 86 which may be separate from motor driven gear box.

As the ground coffee is conveyed, as from the right to the left, it discharges through one or more outlet openings 88 at the base of the box 22 in the zone of the sleeve 60, and drops onto a vibratory prior art scalper assembly 90 which separates the ground coffee from the chaff to be further processed in a known manner.

In conventional coffee grinder-mixer assemblies, to produce regular yield (16 ounce) ground coffee, a single shaft mounting both a spiral and paddles is used. The paddle assembly zone is provided with one or more partition walls or baffles. As the coffee is driven towards the baffles by the mixer shaft spiral and paddles, a back pressure is developed which re-compacts the coffee to produce denser and more agglomerated particles. As will be seen from the drawings herein, there are no such baffles which are present.

In accordance with the present embodiment, for high yield (13 ounce) coffee, the shaft and sleeve are co-rotated. The paddles are set at an angle to promote the combination of the driving of the ground coffee in the direction initiated by the spiral, minimizing compacting of the ground coffee. However, when the ground coffee is to be "mixed" to produce a regular yield (16 ounce) coffee, the sleeve is counter-rotated, with the paddles being set to tend to drive the ground coffee rearwardly towards the spiral. That produces sufficient back pressure, such that as the coffee exits through the outlets 88, it is sufficiently re-compacted and agglomerated to produced regular grind (16 ounce) coffee.

Thus, all that is needed with the improved grinder-mixer assembly to switch over from high yield production to regular yield ground coffee production is to reverse the motor of the reversible motor driven gear box 86 and to set the desired relative speeds of the drive for the mixer shaft 40 and that of the sleeve 60. Under unusual circumstances it may be desirable also to adjust the angle of attack of the paddles, although this should usually be unnecessary.

The control panel 91 (shown in schematic form) for operating the motors and associated drive trains, provides switches to energize or de-energize the motors, and includes an adjustable speed controller 92 for the mixer shaft gear drive and motor assembly 50, an adjustable speed controller 94 for the mixer sleeve motor driven gear box 86, and a reversing switch 96 for the mixer sleeve motor driven gear box 86, and other usual controls 98, such as for the vibrating scalper and the like.

Thus, the coffee grinder assembly of the present application may be similar in most regards to those known to the art, except that they may be adapted, in accordance with the principles of the present invention, to the alternative ready processing of high yield and regular yield coffees with the shaft means, drive assembly and control mechanisms as described herein.

It will be apparent to those skilled in the art that modifications may be made in the embodiment illustrated without departing from the spirit and scope of the present invention. Therefore, we do not intend our invention to be limited, except insofar as may be necessary in view of the claims.

What is claimed is:

1. A coffee grinder-mixer assembly for producing high yield coffee and regular yield coffee comprising:

a grinding head, an elongated mixer box for receiving ground coffee from said grinding head adjacent one end and for discharging ground coffee therefrom adjacent the other end, a first elongated shaft means mounting auger means and supported for rotation in said mixer box, said auger means being disposed to drive ground coffee along said elongated mixer box from said one end towards said other end, second elongated shaft means concentric with said first shaft means for rotation relative to said first shaft means, said second shaft means being disposed adjacent said other end of said box and downstream of said auger means, a plurality of paddles mounted on said second shaft means, and means for driving said first shaft means and for driving said second shaft means, one relative to the other.

2. A coffee grinder-mixer assembly for producing high yield coffee and regular yield coffee in accordance with claim 1 and wherein each said paddle comprises an arm and a pair of paddle members on each arm.

3. A coffee grinder-mixer assembly for producing high yield coffee and regular yield coffee in accordance with claim 1 and wherein said driving means comprises means for alternately co-rotating and counter-rotating said first shaft means and said second shaft means.

4. A coffee grinder-mixer assembly for producing high yield coffee and regular yield coffee in accordance with claim 1 and wherein said auger means comprises a spiral and said second shaft means is mounted with bearings on said first shaft means, and further comprising separate driving means for each of said first shaft means and said second shaft means.

5. A coffee grinder-mixer assembly for producing high yield coffee and regular yield coffee in accordance with claim 1, and further including means for reversing the direction of rotation of the means for driving said second shaft means.

6. A coffee grinder-mixer assembly for producing high yield coffee and regular yield coffee in accordance with claim 2, and wherein said paddle members each comprise an L-shaped member having a long leg and a short leg, with the long legs being fixed with a said arm in parallel array, and with the short legs each extending outwardly from the arm.

7. A coffee-grinder mixer assembly for producing high yield coffee and regular yield coffee in accordance with claim 3, and wherein said second shaft means is a sleeve mounted with bearings on said first shaft means.

* * * * *